United States Patent [19]

Lundström

[11] 4,438,576

[45] Mar. 27, 1984

[54] VIBRATING DITCHER PLOW

[76] Inventor: Ove V. Lundström, Box 76, Vuollerim, Sweden, S-96030

[21] Appl. No.: 285,108

[22] PCT Filed: Nov. 19, 1980

[86] PCT No.: PCT/SE80/00294

§ 371 Date: Jul. 20, 1981

§ 102(e) Date: Jul. 20, 1981

[87] PCT Pub. No.: WO81/01433

PCT Pub. Date: May 28, 1981

[30] Foreign Application Priority Data

Nov. 19, 1979 [SE] Sweden ............... 7909545

[51] Int. Cl.³ .................................. E02F 5/02
[52] U.S. Cl. ........................ 37/98; 37/DIG. 18; 172/40
[58] Field of Search .......... 37/195, DIG.18, DIG. 19, 37/98, 142 R; 172/40; 299/14

[56] References Cited

U.S. PATENT DOCUMENTS

| | | |
|---|---|---|
| 2,725,799 | 12/1955 | Day et al. ............... 37/DIG. 18 |
| 3,002,574 | 10/1961 | Padrick ................ 37/142 R X |
| 3,090,983 | 5/1963 | Modrak et al. ........... 37/DIG. 18 |
| 3,618,237 | 11/1971 | Davis ............................ 37/98 |
| 3,627,056 | 12/1971 | Rogers ......................... 172/40 |
| 3,711,970 | 1/1973 | Briar ............................ 37/98 |
| 3,857,609 | 12/1974 | Felix ..................... 37/DIG. 18 |
| 4,179,227 | 12/1979 | Child, Jr. et al. ........ 37/DIG. 18 X |
| 4,253,704 | 3/1981 | Levin .................... 37/DIG. 18 |
| 4,269,274 | 5/1981 | Robertson et al. ............. 37/142 R |

FOREIGN PATENT DOCUMENTS

| | | |
|---|---|---|
| 1292844 | 10/1972 | Australia .................. 37/DIG. 18 |
| 962837 | 2/1975 | Canada .................... 37/DIG. 18 |
| 118213 | 7/1970 | Denmark .................. 37/DIG. 18 |
| 2126273 | 12/1971 | Fed. Rep. of Germany .... 37/DIG. 19 |
| 2742988 | 3/1978 | Fed. Rep. of Germany .... 37/DIG. 18 |
| 34801 | 8/1911 | Sweden ......................... 37/98 |
| 965194 | 7/1964 | United Kingdom ............ 172/196 |
| 1192997 | 5/1970 | United Kingdom ......... 37/DIG. 18 |

*Primary Examiner*—E. H. Eickholt
*Attorney, Agent, or Firm*—Burns, Doane, Swecker & Mathis

[57] ABSTRACT

For the ditching of drains normally various types of excavating machines are used. This involves problems, however, especially when the ground has poor carrying capacity, for example in wetlands. According to the invention, therefore, a body is proposed which has substantially V-shaped cross-section and smooth lower sides, and which is advanced through the soil masses to be removed for ditching the drain with a pointed end along the height of the body with a closed end facing in the direction of advancement. Simultaneously, the body is subjected to at least downwardly directed striking forces with relatively high frequency. In this way, the body is maintained pressed down into the soil masses while it is being advanced. The soil masses are thereby removed substantially in lateral direction by the side surfaces of the body and compacted. For effecting the striking forces, preferably a vibrator is provided within the body.

8 Claims, 5 Drawing Figures

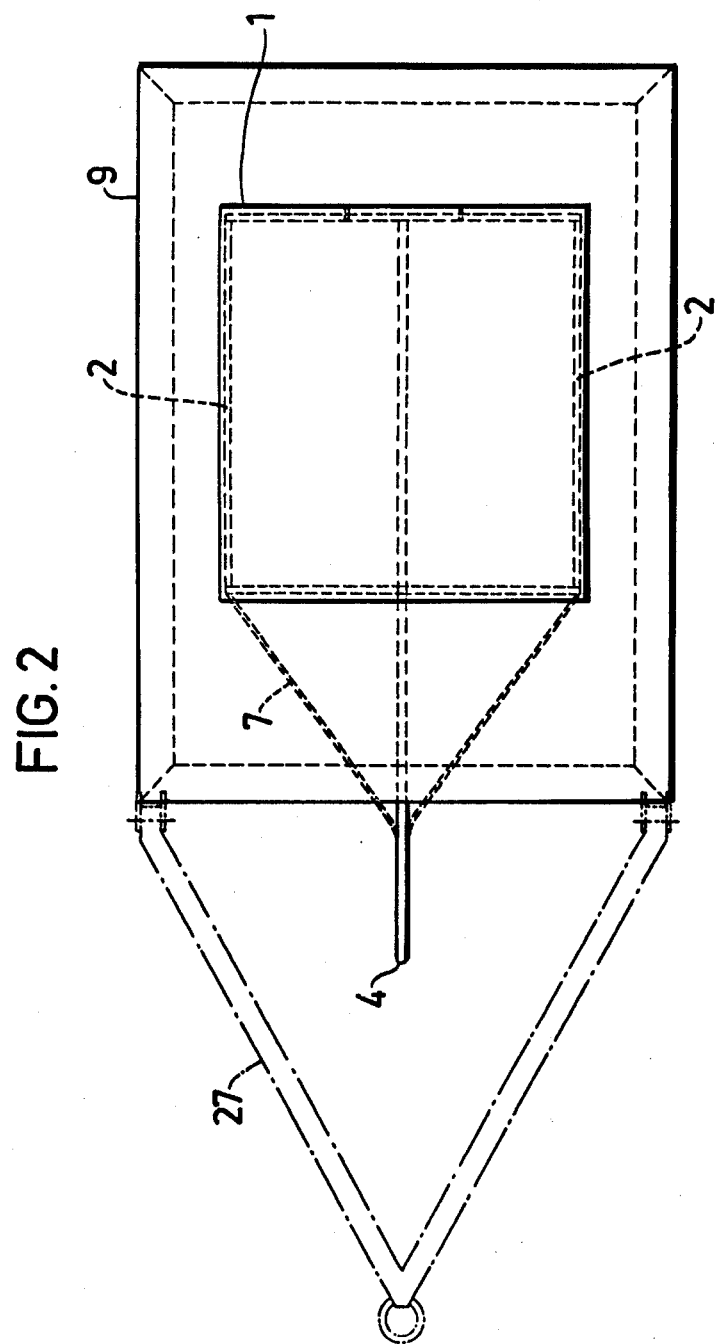

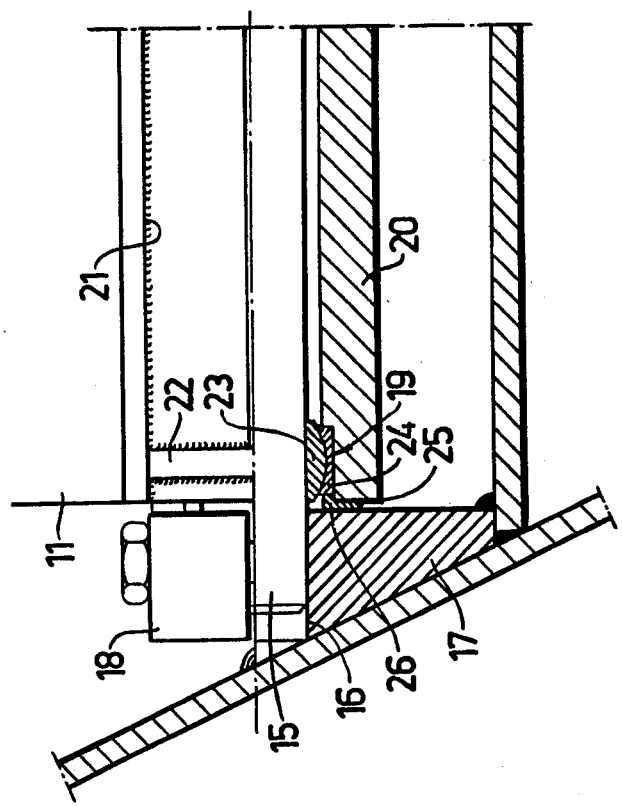
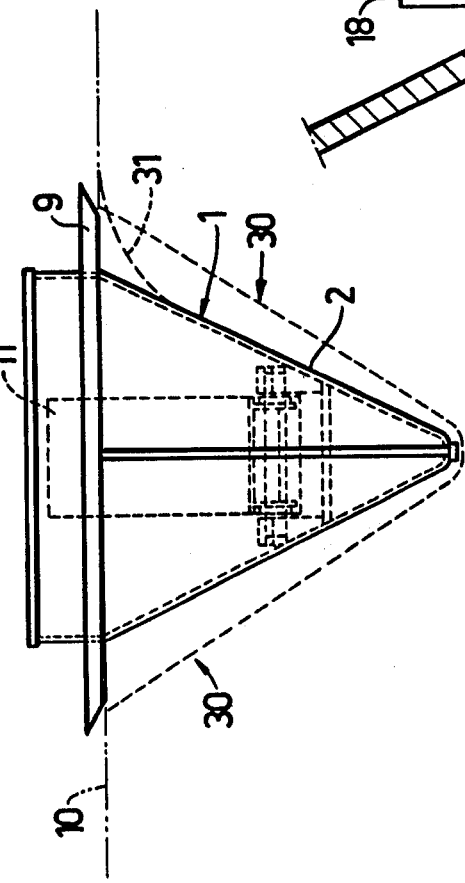

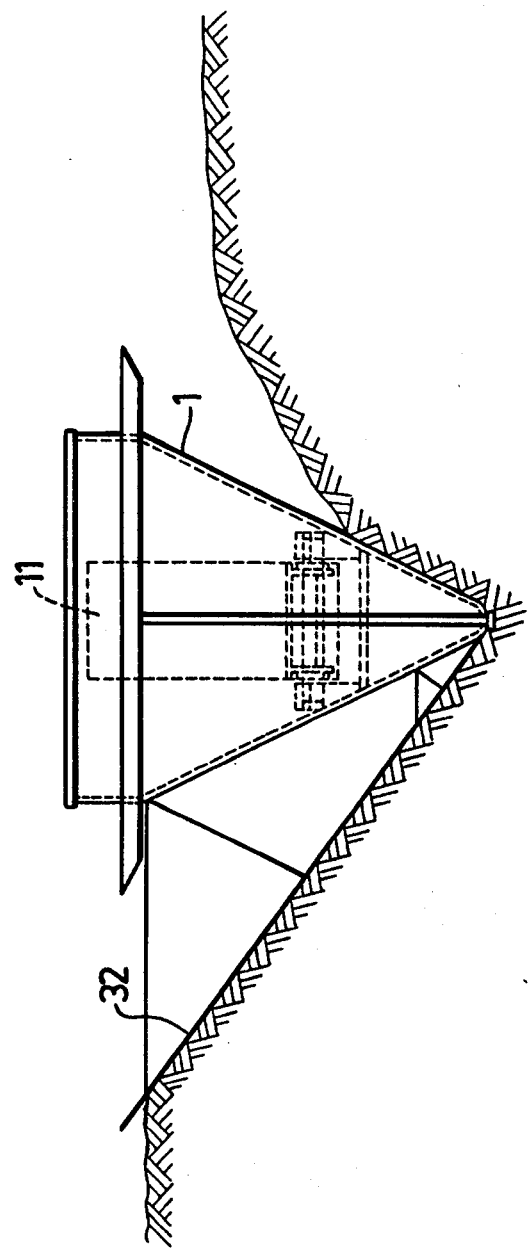

VIBRATING DITCHER PLOW

This invention relates to a method of draining wetland as, for example, peatland, mosses, marshes and the like, as well as forest land and arable land, and to a device for carrying out the method.

Apart from manual ditching, lands of the aforesaid kind heretofore have been drained exclusively by excavating machines of various types, by which normally only lengths of about 3 m can be ditched whereafter the machine has to be moved and re-positioned. For each such length the bucket of the machine must be filled and emptied at least six times. On wetland the excavating machine must be moved and re-positioned more frequently, to prevent the machine from sinking down and getting stuck. It is obvious that draining with excavating machines is complicated, tedious and thereby expensive. Furthermore, with this conventional ditching method soil or peat masses are obtained which not in all cases can be placed on the ditch edges, but must be carried away. In such cases the drainage costs increase substantially.

In ditches especially in wetland the sides often collapse due to the increase in pressure caused by the masses placed on the ditch edges. The ditches thereby are filled with mud relatively quickly and become more shallow. It is not possible, either, to drain very wet land by means of excavating machine, and such ditching normally must be carried out manually.

The present invention, therefore, has as and object to provide a method and a device for ditching, which do not show the aforesaid disadvantages, but are much more rapid and rational and render it possible to ditch without producing any soil masses, which have to be stacked or transported away. Further, the present invention renders it possible to ditch in such wetlands, which do not carry, for example, an excavating machine.

These object and others are achieved in that the method and the device according to the present invention.

BRIEF DESCRIPTION OF THE DRAWINGS

The invention is described in greater detail in the following, with reference to the accompanying drawings, in which FIGS. 2 and 3 are views of the same embodiment seen from above and, respectively, from the front, FIG. 4 is a partial sectional view of an enlarged detail of the device according to the invention, FIG. 5 is a view of a modified application of the invention.

DETAILED DESCRIPTION OF THE PREFERRED EMBODIMENT

Figure 1:
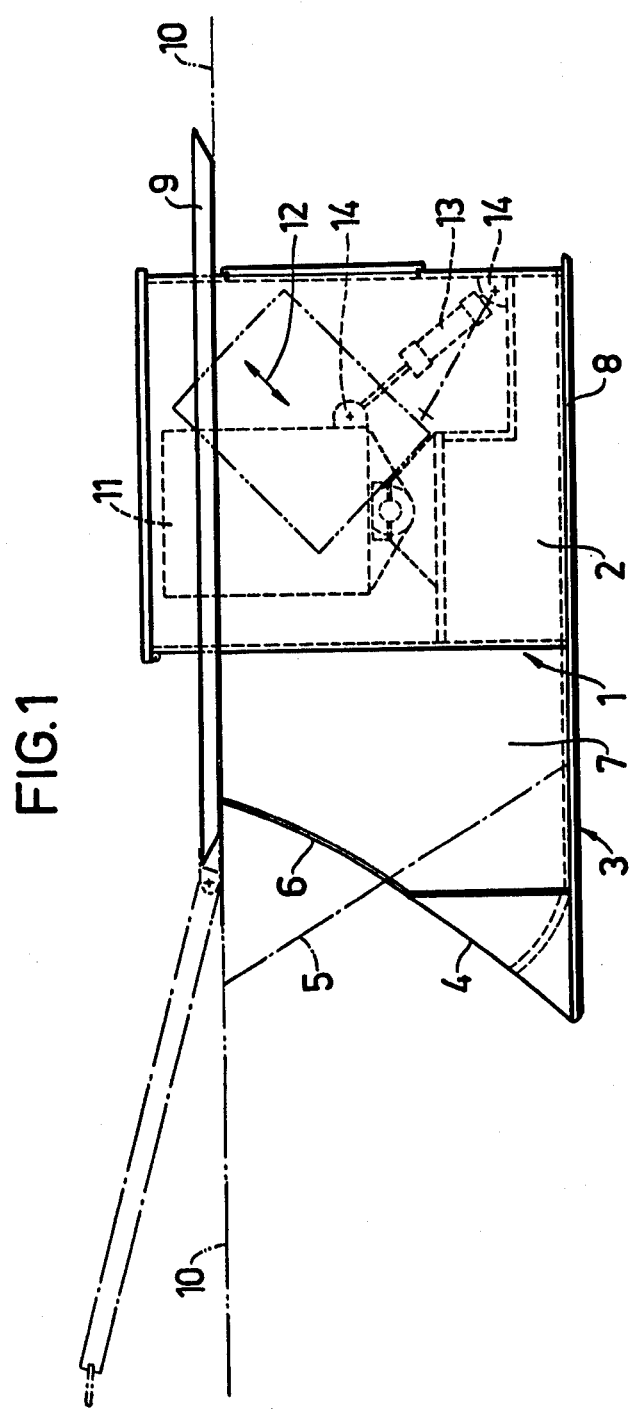
FIG. 1 is a view of an embodiment of the invention.

The device according to the embodiment shown in FIGS. 1-4 comprises a V-shaped frame 1 with smooth sides 2 of a low-friction material, for example sheet metal. The sides 2 are arranged symmetrically with respect to an axial line of the frame 1. The sides 2 though shown to be parallel in the machine direction along their entire length may at their rear portion be formed with inclination, i.e. may be deflected inward or be given slightly convex arc-shape, in order to reduce to the greatest possible extent the counterforces against advancing which arise especially in wet lands.

The frame 1 further is formed or provided with a plough-like forward portion 3 with a generally V-shaped horizontal cross-section, the forward free boundary edge 4 preferably is formed like a cutting edge, and which forwardly is closed vertically and can be straight or undercut to arc-shape, as shown by dashed lines 5 in FIG. 1, or be straight or overcut to arc-shape, as shown by fully drawn lines 6 in FIG. 1, or be vertical. The smooth sides 7 of the forward portion preferably consist of the same material as the frame sides 2. The V-shape of the frame can be made wider or narrower than shown in the drawings and thereby be adjusted to the cross-sectional shape of the drain to be ditched. At its rear portion, the frame 1 can be formed or provided with a portion similar to the forward portion 3, so that the device can be advanced in one direction or the other without having to be turned around. Along the narrow, preferably slightly rounded lower surface of the frame 1, a wear bar 8 is located which, of course, also extends over the forward portion 3 and possibly the rear portion.

At its upper part the device is provided with a horizontal plate 9, which in the embodiment shown extends over the frame in order upon demand to be able to act as a support plane for the device. The front edge portion in the advancing direction of the plate, therefore, preferably should be formed like a brim, though this is not shown in the drawings.

The plate 9 has the object during the ditching to show the ditching depth of the device relative to the ground, as indicated by 10 in FIGS. 1 and 3.

Within the frame 1 a vibrator means 11 is located, the stroke direction of which is indicated by the double arrow 12. The vibrator means 11 is mounted pivotally and can be set in different angular positions relative to the ground 10. This adjustment of the vibrator 11 is effected by a piston-cylinder means 13, which is hingedly attached between the vibrator 11 and the frame 1 by means of vibration-absorbing rubber bushings 14, and which preferably is remote controlled.

The vibrator 11 more precisely is shown pivotally attached on an axle 15, which is rigdly secured in the frame 1 and at each end is held clamped against a semi-circular surface 16 of a support boss 17 attached to the side 2. The clamping is effected by a cap 18 screwed on the support boss. On the axle a thick-walled pipe 20 is pivotally mounted by a number of bearings 19, which pipe is connected to the lower surface 21 of the vibrator by load-distributing flanges 22. Each of the bearings 19 comprises a slide bearing ring 23 located on the axle 15 and a slide bearing cup 24 of annular shape, which is connected to the pipe 20, and in which the slide bearing ring runs. For fixing the pipe 20 in axial direction, a distance member 26 is provided between each pipe end 25 and the adjacent support boss 17, as shown in FIG. 4.

The striking forces produced by the vibrator 11, thus, are transferred via the pipe 20, axis 15 and support bosses 17 to the frame 1. The vibrator 11 being in vertical position, the striking forces act in vertical direction and drive the V-shaped frame 1 into the ground to the depth intended, which depth is indicated by the plate 9 projecting from the frame by its position relative to the ground. The frame 1 preferably is given such height as to correspond to the ditch depth intended. In such a case, thus, the frame 1 is to be driven down until the plate 9 substantially is on the same level as the ground, and is then caused to maintain said depth during the advancing movement of the device.

For the advancing movement any suitable vehicle, preferably a caterpillar vehicle, can be used, to which the device is coupled by a tie rod 27 or a winch with one or more long towing wires in the case of such wet lands, which cannot even carry a caterpillar vehicle.

During the advancing of the vehicle, the vibrator 11 acts on the frame 1 and prevents it from being lifted or pressed upward out of the ground. The frame thus advanced in the ground, owing to its design and the downward directed striking forces produced by the vibrator, presses away the soil masses and compacts them, and thereby continuously forms a ditch with a cross-sectional shape corresponding substantially to that of the frame. In certain lands, for example peatlands, a certain return expansion may occur which, however, can be compensated for by designing the V-shape of the frame wider than the V-shape of the completed ditch which is conditioned by the angle of repose of the material in question.

The working depth of the device is controlled by the vibrator 11 and/or by changing the speed at which the device is advanced. At too great a depth of the device the speed increases and thereby the device is pulled up, provided however that the vibrator is not changed. Such elevation of the device can be effected also by pivoting the vibrator in clockwise direction from its vertical position and thereby reduce the downward directed forces of the vibrator at the same time as the forward directed forces promoting the advancing movement are increased. When the device operates too high, its lowering is effected by reducing the advancing speed and/or by pivoting the vibrator counter-clockwise to its vertical position, whereby the downwardly directed forces of the vibrator increase and are capable of pressing the frame deeper into the ground. The fluctuations in the operating depth of the device are indicated directly by the change in the position of the plate 9 relative to the ground level. In its inclined positions, the vibrator, as mentioned, also contributes to the advancing of the device. Especially in very loose lands offering low resistance to the frame being pressed down, thus, the advancement promoting forces of the vibrator are especially high.

When a vehicle equipped with hydraulics is used as traction vehicle, the vibrator should be operated hydraulically. In other cases the vibrator may be operated by an internal combustion engine or the like provided in the device.

The compacting of the soil masses effected by action of the vibrator results in stabilized side surfaces of the ditch, so that the collapse risk is reduced considerably even in wet lands. The compacting effect brought about by the device, as shown in FIG. 3 at 30, is greatest at the ground surface and decreases toward the ditch bottom. This implies the advantage that the afflux of water to the greatest part occurs in the ditch bottom where a certain hydraulic water pressure prevails, whereby the draining is accelerated. By designing the frame sides upwardly to deflect outward, as indicated by dashed lines 31 in FIG. 3, the compacting zone 30 can be increased.

In FIG. 5 is illustrated schematically that the device according to the invention can be provided with attachments formed for special purposes or be used as carrying and driving unit for such attachments. The attachment shown in FIG. 5 is a lateral wing 32 intended for the deepening of ditches along the road, at the same time as an additional pressing of the road slope is effected by the wing.

The present inventuon is not restricted to what is described above and shown in the drawings, but can be changed and modified in many different ways within the scope of the invention idea defined in the attached claims. As regards the vibrator 11, of course, its capacity with respect to at least the force applied per stroke and the vibration frequency or frequencies per minute must be adjusted to prevailing ground conditions and, therefore, can vary within wide limits within the scope of the invention.

I claim:

1. A device for ditching a drain in soil, comprising a body which is intended to be advanced in the ground, said body having a substantially V-shaped vertical cross-section with the base of the V pointed downward and substantially smooth lower sides, the body at least in the direction of advancement having a forward portion with a pointed end closed vertically along the height of the body, the forward portion having a generally V-shaped horizontal cross-section, the body being provided with vibrator means for producing striking forces, said vibrator means being adapted to subject the body to at least downward directed striking forces, and said forces maintaining the body pressed down while the body is advanced through the soil masses, the height of the body being greater than the depth of the ditch such that the soil masses are pressed aside substantially laterally and compacted.

2. The device as defined in claim 1, wherein the vibrator means is adjustable within the body for controlling the direction of the striking forces produced by the vibrator means.

3. The device as defined in claim 1 wherein the body at its upper part is provided with a plate which extends outward from the body and acts as a supporting plane.

4. The device as defined in claim 2, wherein the vibrator means is adjustable at least about a horizontal axle extending perpendicularly to the direction of advancement of the device.

5. The device as defined in claim 1, wherein a portion of the body is arranged forward in the direction of advancement and constitutes a narrow downwardly facing bottom portion which is drawn upward to form a brim.

6. The device as defined in claim 1, wherein the pointed end of the body which is the forward end in the direction of advancement is overcut.

7. The device as defined in claim 1, wherein said end is formed as a cutting edge.

8. The device as defined in claim 1, wherein the pointed end of the body which is the forward end in the direction of advancement is undercut.

* * * * *